United States Patent [19]

Armstrong

[11] Patent Number: 5,565,891
[45] Date of Patent: Oct. 15, 1996

[54] SIX DEGREES OF FREEDOM GRAPHICS CONTROLLER

[76] Inventor: Brad A. Armstrong, 848 Inyo St., Chico, Calif. 95928

[21] Appl. No.: 393,459
[22] Filed: Feb. 23, 1995

Related U.S. Application Data

[63] Continuation-in-part of Ser. No. 847,619, Mar. 5, 1992.
[51] Int. Cl.$^6$ .................................................. G09G 3/02
[52] U.S. Cl. ........................................... 345/167; 345/156
[58] Field of Search ..................................... 345/167, 156, 345/157, 161, 163, 164, 168; 341/20, 21, 22; 74/471 XY; 273/148 B

[56] References Cited

U.S. PATENT DOCUMENTS

| D. 355,901 | 2/1995 | Bradley | D14/114 |
|---|---|---|---|
| 4,555,960 | 12/1985 | King | 74/471 XY |
| 4,924,216 | 5/1990 | Leung | 345/158 |
| 4,933,670 | 6/1990 | Wislocki | 345/167 |
| 5,065,146 | 11/1991 | Garrett | 345/161 |
| 5,128,671 | 7/1992 | Thomas, Jr. | 345/161 |
| 5,237,311 | 8/1993 | Wislocki | 345/167 |
| 5,293,158 | 3/1994 | Soma | 345/161 |
| 5,298,919 | 3/1994 | Chang | 345/167 |
| 5,329,276 | 7/1994 | Hirabayashi | 345/161 |

OTHER PUBLICATIONS

"Development of a General Purpose Hand Controller for Advanced Teleoperation" KV Siva Harwell Laboratory, UK. Jul. 1988.
"Gyber Man" Logitech 1993.

Primary Examiner—Mark R. Powell
Assistant Examiner—Doon Chow

[57] ABSTRACT

A hand manipulated six degree of freedom controller wherein a partially exposed freely rotatable trackball within a carriage is movable in all linear directions relative to a stationary housing. The controller sends information describing rotation of the trackball about three mutually perpendicular axes referred to as yaw, pitch and roll, and information describing linear moment of the trackball along the axes to a host computer or like graphics generator and display for control of graphics. The controller includes the housing supporting the movable carriage, with the carriage supporting the trackball. The carriage is movably retained for allowing linear movement of the carriage and thus the trackball along the three mutually perpendicular axes independent of the housing. A portion of the carriage or the trackball is exposed to allow manual manipulation of the carriage position. Sensors are positioned for sensing linear moment of the carriage and thus the trackball relative to the housing and creating moment related information indicative of the direction of the sensed linear moment. Sensors are positioned for sensing rotation of the trackball relative to the carriage and thus housing, and creating rotational related information indicative of the rotation of the trackball about the axes.

18 Claims, 11 Drawing Sheets

SIX DEGREES OF FREEDOM GRAPHICS CONTROLLER

This application is a continuation-in-part of U.S. patent application Ser. No. 847,619 filed Mar. 5, 1992.

BACKGROUND OF THE INVENTION

1. Field of the Invention

This invention relates to control devices having six degrees of freedom input to be operated by the human hand. More specifically, the present invention is a six degree of freedom trackball for use as an input device for controlling or manipulating graphic images such as are displayed by a computer or television display, a head mount display or any display capable of being viewed or perceived as being viewed by a human.

2. Description of the Prior Art

Although there are many hand manipulated trackballs for use as computer control devices taught in the prior art, none are structured similarly to the present invention, and none offer all of the advantages provided by the present invention due to the significant structural differences.

One prior art disclosure which is known to me and which is believed somewhat relevant is taught in U.S. Pat. No. 5,298,919 issued Mar. 29, 1994 to M. Chang. The Chang device is a six axis computer controller for manipulation of computer graphics, and is structured as a mouse type input device having a roller ball on the underside requiring travel of the input device and housing thereof along a surface for the manipulation of the underside ball for input of information pertaining to two axes of linear movement, which is typical of "mouse" type controllers. The Chang device includes a thumb wheel to mimic linear movement along a third axis. The Chang device also includes a second roller ball (trackball) exposed for manual rotation on the upper surface of the housing, and upper trackball is provided to allow the user to input information pertaining to rotation about the three mutually perpendicular or orthogonal axes conventionally referred to as yaw, pitch and roll.

Disadvantages which I believe exist in the Chang device, which I believe I have inventively overcome with the present invention, include the requirement that the trackball housing be moved along a surface in order to input linear moment information. This requirement of surface contacting travel prohibits the use of the Chang device as a completely hand held controller, and prohibits the Chang controller from being incorporated into a multi-purpose controller such as a hand held television remote controller or a conventional computer keyboard. Additionally, substantial physical space is required on a desk or table on which to propel a mouse type controller.

Another disadvantage of the Chang controller is that it is not believed to be intuitive, or in other words, the mouse roller ball on the underside of the housing which inputs linear moment information in some directions, is not capable of inputs in all linear directions, and thus the Chang device includes the thumb wheel on the side which is utilized to emulate, approximate or represent linear movement along the third axis. The manipulative hand movements required to move linearly utilizing pushing of the mouse for some directions, and the actuation of the thumb wheel for other directions is not intuitive and thus sometimes confusing and difficult for the user. Furthermore, a mouse type controller such as Chang's cannot provide the desirable aspect of automatic return-to-center along the linear axes, or in other words, with a mouse, the user must, in some cases, move the mouse back to center since there are no feasible arrangements for the use of return-to-center springs.

Another prior art disclosure which is known to me and which is believed somewhat relevant is taught in U.S. Pat. No. 5,237,311 issued Aug. 17, 1993 to N. C. Wislocki teaching a trackball and selection device. The Wislocki device includes a trackball protruding from a housing. The housing is hingidly supported on one side, and supported on a opposite side by compression springs. On the spring supported side is a selection switch activated with manual downward pushing of the housing or trackball. The Wislocki device is not a six degree of freedom controller or even a six axis controller, and does not teach or anticipate the structure and advantages of the present invention.

Therefore, there exists a need for further improvements in the field of 3D or six degree of freedom controllers for manipulating graphics such as on or through a computer and monitor or television screen or any display.

SUMMARY OF THE INVENTION

The following summary and detailed description is of best modes and preferred structures for carrying out the invention, and although there are clearly changes which could be made to that which is specifically herein described and shown in the included drawings, for the sake of briefness of this disclosure, all of these changes which fall within the true scope of the present invention have not herein been detailed, but should be apparent to those skilled in the art.

In order for a user to manipulate objects and/or navigate a viewpoint within a three-dimensional graphics display, I have developed a hand manipulated six degree of freedom trackball controller for use with a computer or computerized television or the like wherein the trackball is freely rotatable and movable linearly in all possible directions. The controller provides structuring for translating full six degrees of freedom physical input provided by a human hand into outputs or signals useful either directly or indirectly for controlling or assisting in controlling graphic image displays. The controller includes the partially exposed trackball which is freely spherically rotatable and movable linearly in all directions. The controller sends information describing rotation of the trackball about three mutually perpendicular axes herein referred to as yaw, pitch and roll; and information describing linear moment of the trackball along the axes to a host computer or like graphics generation device for manipulation or control of graphics or images of a display.

The controller includes a housing in part supporting and protecting a carriage, with the carriage supporting or retaining the trackball. The carriage is movably supported relative to the housing in such a way as to allow linear movement of the carriage and thus trackball in all possible directions along the three mutually perpendicular axes. Sensors are positioned for sensing rotation of the trackball and creating rotational related information indicative of the rotational direction, amount and about which axis the trackball is rotated. A portion of the carriage or the trackball is exposed to allow manual linear manipulation. Sensors are also positioned for sensing linear moment of the carriage and thus the carriage supported trackball relative to the housing and creating moment related information indicative of the direction of the sensed linear moment.

For the purposes of this disclosure, the term "moment" is being utilized as meaning status, or direction, indicated in terms of either position or pressure. Moment is primarily an indication of the status of the carriage: what direction it is moved, and in that direction how far positionally it is moved, or how intensely it is pressed relative to the housing. These terms defining "moment" are somewhat dependent upon type and sophistication of the sensors utilized, and a variety of sensors may be utilized with the present invention. For example, simple on-off contact sensors will indicate the direction that the carriage is moved but only if it is moved a significant amount positionally sufficient to activate the sensor, and the on-off contact sensor will provide information describing whether the carriage is at the sensor or not at the sensor, which in either case is valuable and useful information. A more sophisticated proportional positional sensor such as a potentiometer or optical positional sensor, etc. will indicate direction and position to a greater degree. Pressure sensitive sensors which are commonly available will yield direction and intensity that the carriage is being pressed relative to the housing. Additionally, some types of proportional sensors coupled with return-to-center resilient structure may respond to a combination of position and pressure with one characteristic being dominant or more meaningful to output. The term "moment" is essentially a word indicating a significant event, status or current position.

For the purposes of this disclosure the term "sensor" or "sensors" is considered to include not only proximity sensors; variable resistive and/or capacitive sensors, piezo sensors, variable voltage/amperage limiting or amplifying sensors and switches, potentiometers, resistive and optical encoders and the like, but to also include simple on/off switches.

With the present invention, there exists no requirement that the housing be moved or repositioned like that of a mouse type control for a computer, and this aspect renders many advantages. For example, the movable carriage supporting the trackball may be built into or attached onto an otherwise conventional computer keyboard; built into a hand held television style wired or wireless remote control device; built into the arm of a chair, or it may be built into a housing specific for the carriage and trackball, and one which is structured to rest upon a support surface such as a table or desk when utilized.

A primary object of the invention is to provide an improved hand manipulated six degrees of freedom controller primarily for use in controlling or at least assisting in controlling graphic images such as those displayed by a computer, television display, head mount display or heads-up display, or the like.

A further object of the invention is to provide and meet the aforementioned objects in a six degree of freedom controller while providing the advantage of versatility of complex movements wherein all three perpendicular Cartesian coordinates (three mutually perpendicular axes herein referred to as yaw, pitch and roll) are interpreted bi-directionally, both in a linear fashion as in movement along any axis and a rotational fashion as in rotation about any axis. These linear and rotational interpretations can be combined in every possible way to describe every possible interpretation of three dimensions.

A further object of the invention is to provide and meet the aforementioned objects in a six degree of freedom controller which includes structuring allowing for the linear related information to be pure linear, not including even a small degree of arcing or rotational information. It is anticipated some demanding control applications do or will require the allowance of pure or complete separation of rotation and linear travel, and the preferred structure of the present invention will provide such pure separation.

A further object of the invention is to provide and meet the aforementioned objects in a six degree of freedom controller which allows for the application and advantage of sensor choice. This invention is an input device that has physical manifestations that can stimulate any of various types of useful sensors. The invention can be constructed with sensors as inexpensive as simple electrical contacts for linear information or more sophisticated proportional sensors such as positional or pressure reading sensors, or the like.

A further object of the invention is to provide and meet the aforementioned objects in a six degree of freedom controller while providing the advantage of a generally stationary input position for the user. Unlike the prior art, such as typical mouse devices which require travel of the ball physically over a surface to activate sensors, and the surface area requirement might be great, the present invention requires no significant physical movement along a surface.

A further object of the invention is to provide and meet the aforementioned objects in a six degree of freedom controller which preferably includes resilient structuring providing a self centering or return to a center null position of the controller structuring regarding linear movements, and further, wherein there exists a small degree of "play" between significant sensor activation or moment which helps compensate or provide a degree of forgiveness for small unintentional hand movements on the controller.

A further object of the invention is to provide and meet the aforementioned objects in a six degree of freedom controller which preferably includes a detectable feedback, preferably felt by the user's hand, or possibly audibly detected, which will indicate that he has moved the trackball carriage sufficiently from the null position to activate a linear sensor.

A further object of the invention is to provide and meet the aforementioned objects in a six degree of freedom controller which could also be useful as a simple two axis controller such as a typical mouse or trackball.

A further object of the invention is to provide and meet the aforementioned objects in a six degree of freedom controller which is relatively inexpensive to manufacture, using relatively few parts which can be inexpensively purchased and or manufactured utilizing modern manufacturing processes including plastic injection molding.

These, as well as further objects and advantages of the present invention will become better understood upon consideration of the remaining specification and drawings.

BEST MODES FOR CARRYING OUT THE INVENTION

Figure 1:
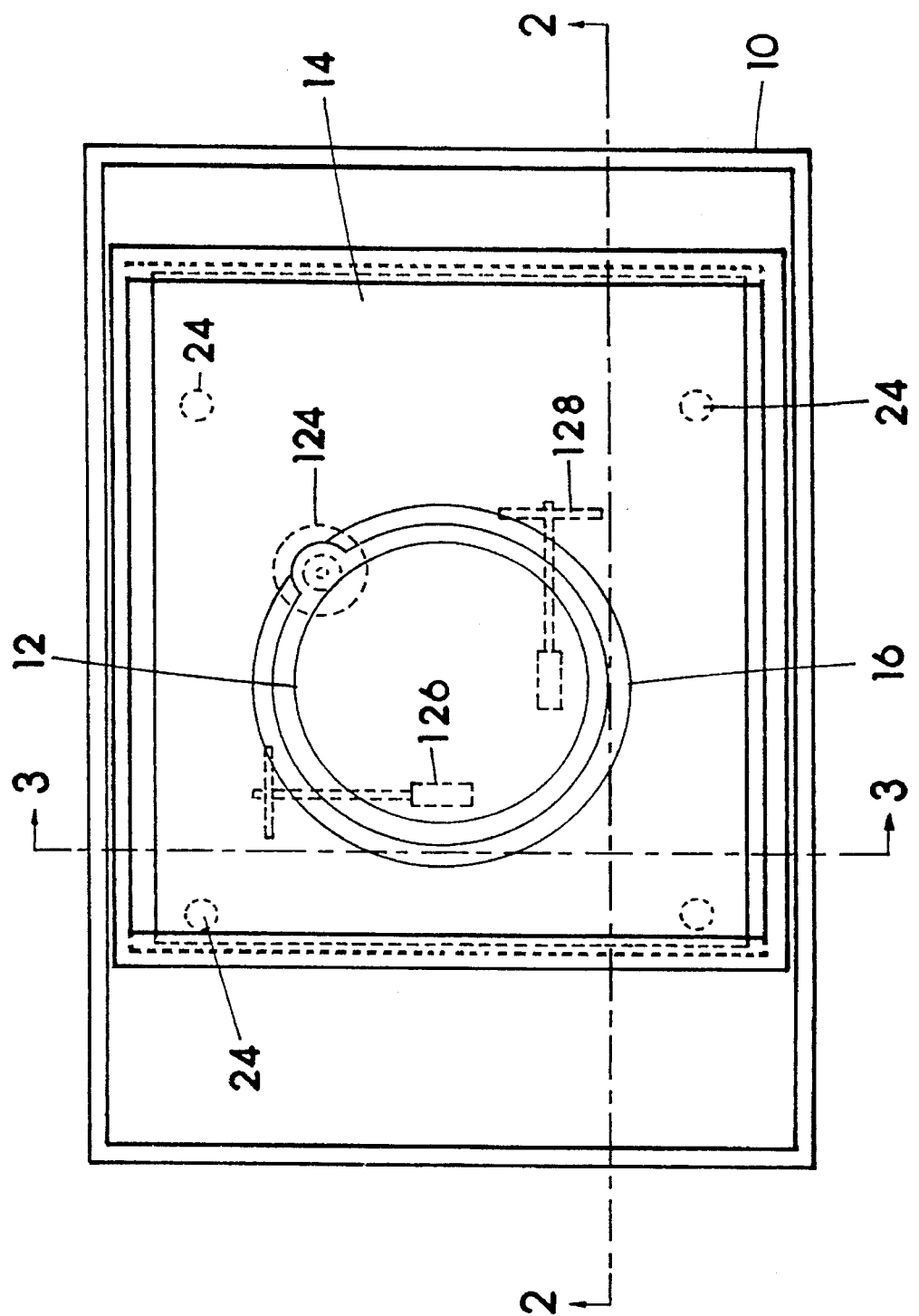
FIG. 1 is a top view of an embodiment of the invention within a housing specific for the carriage and trackball.
Figure 2:
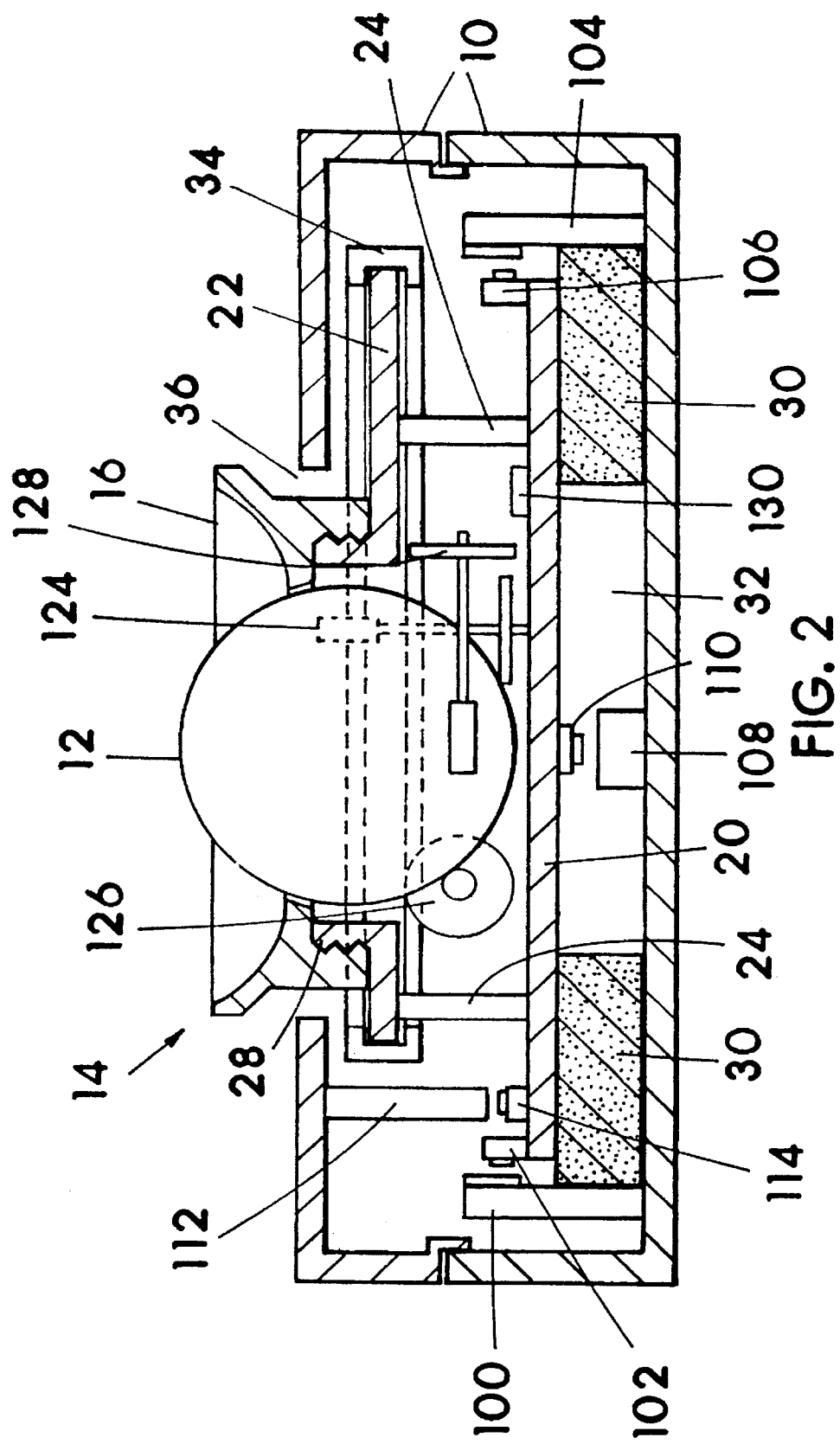
FIG. 2 is a cross-sectional side view of the FIG. 1 embodiment taken at line 2.
Figure 3:
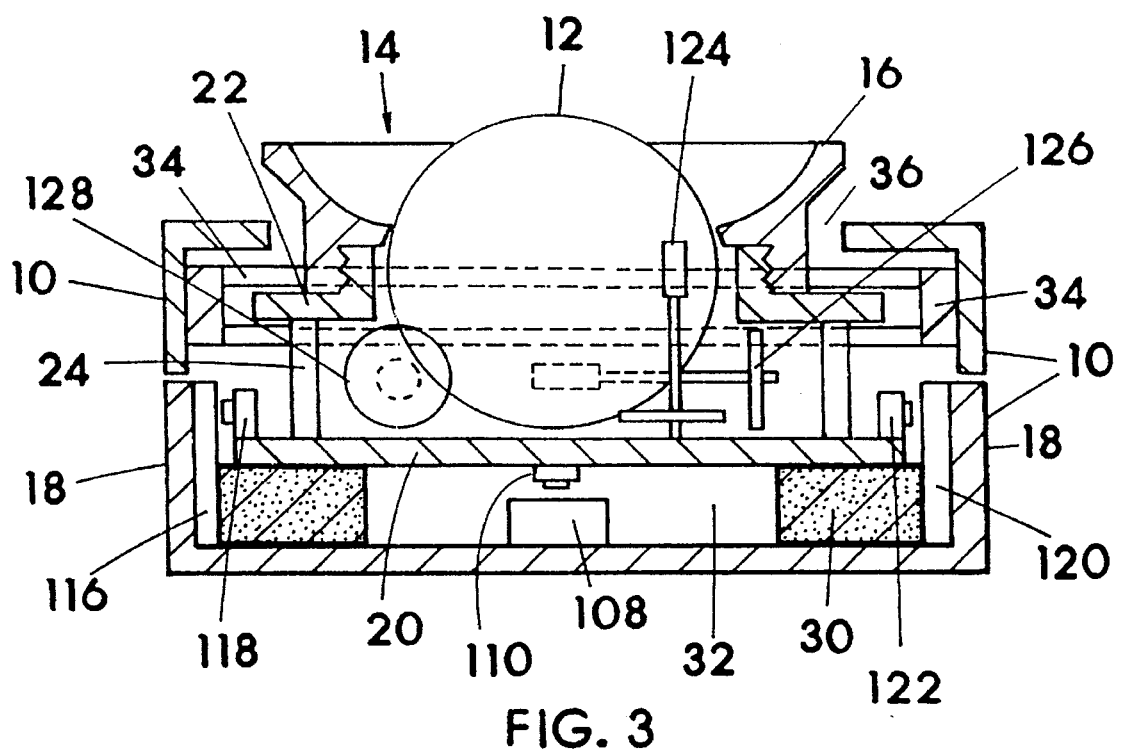
FIG. 3 is a cross-sectional end view taken at line 3 of FIG. 1.

Referring now to the drawings in general and to FIGS. 1–4 in particular wherein an embodiment of the present hand manipulated six degree of freedom controller for outputting control information is illustrated showing a rectangular housing 10 with trackball 12 from a top view. FIGS. 2–3 being cross-sectional views of the FIG. 1 embodiment showing housing 10 which can at least in part support, retain and protect the movable carriage 14. All of the structural embodiments of the invention preferably include some form of housing 10, i.e. enclosure being useful for not only in part or in full retaining and supporting the movable carriage 14, but being useful for physically protecting delicate parts, wires, electronic components and the like, and for aiding to prevent the entrance of debris to such a degree as to adversely effect operation of the controller.

Figure 8:
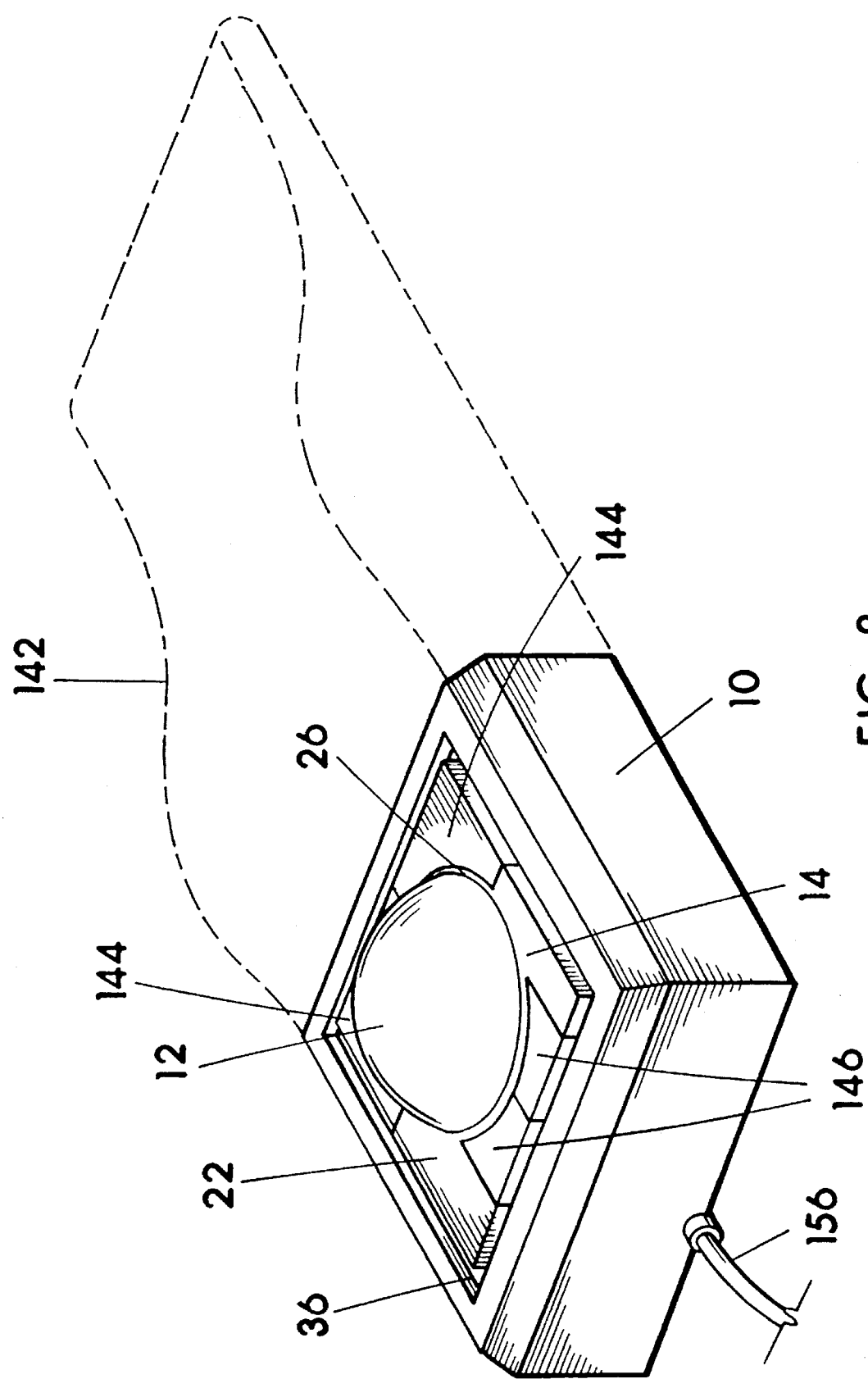
FIG. 8 is an illustration of a housing structured specific for the carriage and trackball, and one which is structured to rest upon a support surface such as a table or desk when utilized. A dotted outline indicates the possibility of an additional extension which is ergonomically designed as a wrist and forearm rest.
Figure 9:
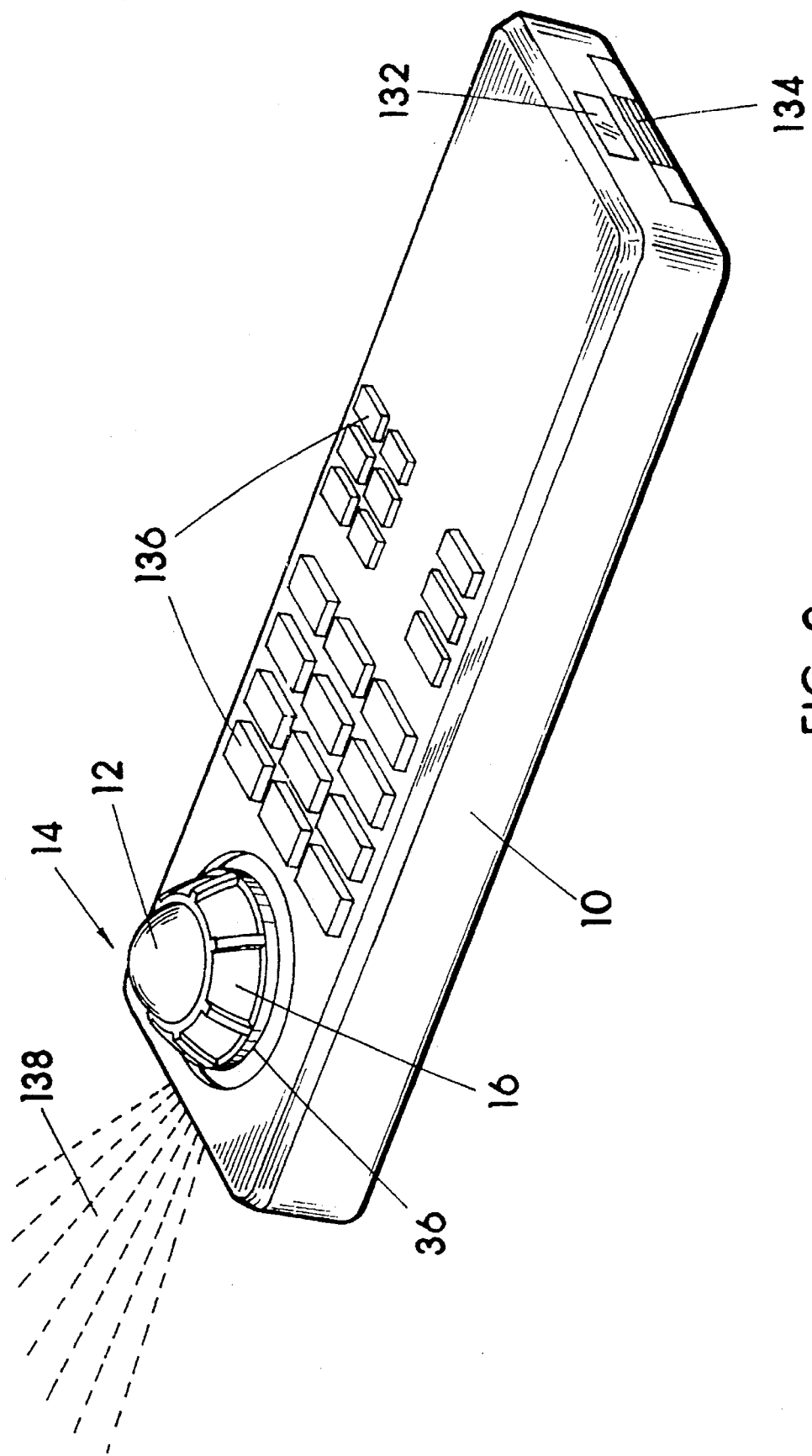
FIG. 9 is the carriage and trackball in a hand held housing sized and shaped to be grasped in a hand of a user while the user manipulates graphic images with the controller.
Figure 10:
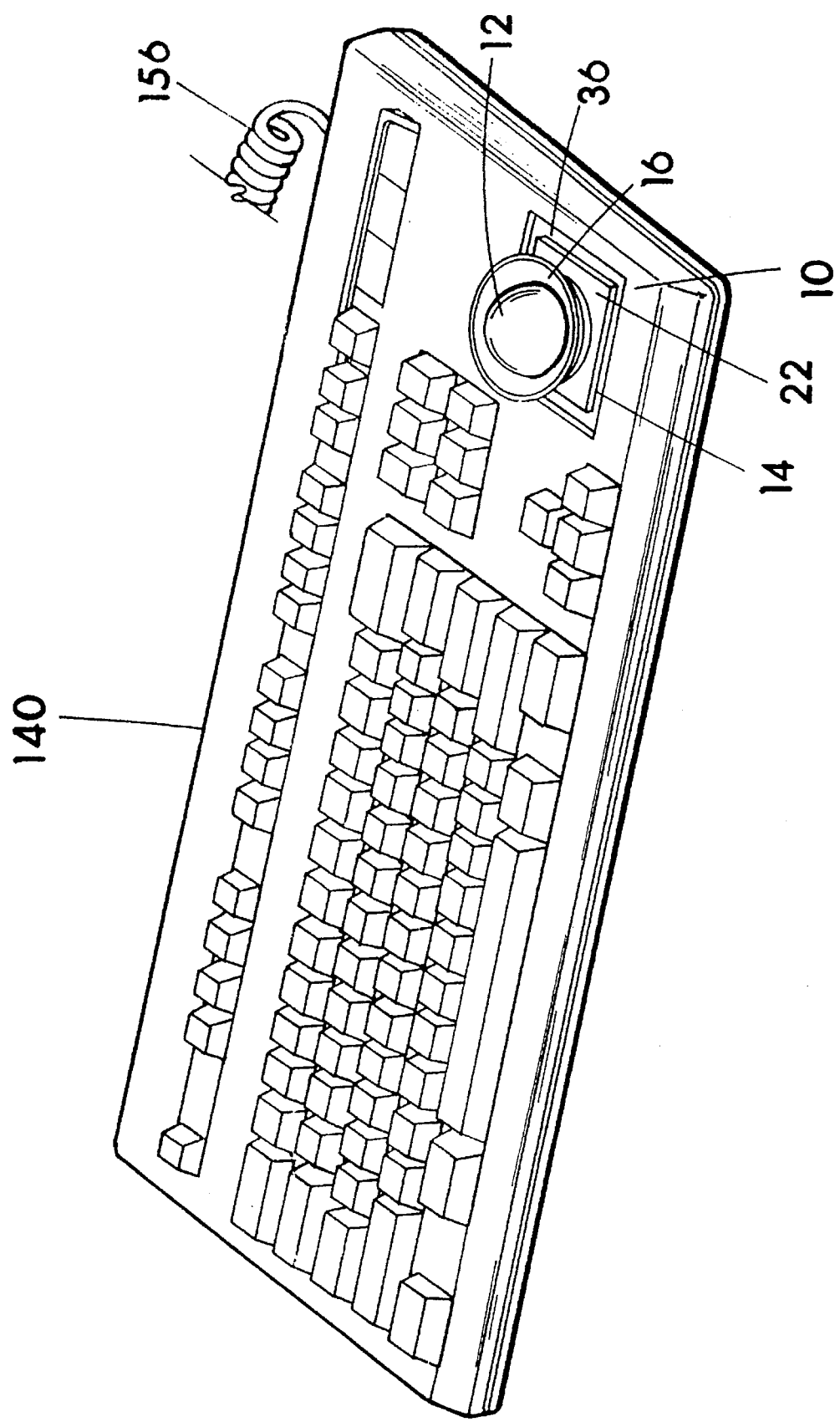
FIG. 10 is the carriage and trackball housed in an otherwise relatively conventional computer keyboard.

As may be appreciated already from the above writing and drawings, carriage 14 is supported at least in part within housing 10 and with structuring for allowing carriage 14 to be movable or moved in all linear directions relative to housing 10, for example, left, right, forward, rearward, up and down, and in the possible combinations thereof. Furthermore, housing 10 may be specific for the present six degree of freedom controller as exemplified in FIGS. 1–3 and 8, or housing 10 of another functional device such as an otherwise typical hand held remote control housing or computer keyboard housing as shown in FIGS. 9 and 10 respectively, and offering or including functions such as keyboarding, on/off, volume control, channel control and the like in addition to that offered by the present six degree of freedom controller. Housing 10 may be in effect the panel or panels of a control console of a vehicle or machine. Housing 10 may be any size within reason, although trackball 12, any exposed part of carriage 14 or housing 10 intended to be manually manipulated or hand held should of course be correctly sized to interface with the human hand or hands. When housing 10 is too large to allow easy use of the housing walls upon which to place carriage movement stops (stationary walls or posts to limit movement of the carriage) or sensor actuators or sensor supports such as would be likely with the keyboard housing of FIG. 10 wherein the housing side walls are a substantial distance apart, then walls, partitions or posts specific for these purposes may be placed in any desired and advantageous location within housing 10 as shown for example in FIG. 2 wherein actuators 100 and 104 are shown extending vertically upward from the interior bottom of housing 10, inward of the interior side walls, and supporting or serving as a switch/sensor actuator, or a second component of the sensor, such as a second component of a two piece proximity sensor for example. Actuator 100 functions in conjunction with forward sensor 102, and actuator 104 functions in conjunction with rearward sensor 106 in this example. FIG. 3 illustrates for example the use of side walls 18 of housing 10 as the sensor actuators 116 and 120 or anvil for right sensor 118 and left sensor 122. Housing 10 in most all applications will be made of rigid or semi-rigid plastics for cost, weight and strength considerations, although other materials might be functionally suitable.

Although it must be noted that within the scope of the invention carriage 14 functions may conceivably be provided with numerous structures, carriage 14 is shown in the drawings as including a lower member 20 and an upper member 22 positioned above lower member 20. Lower and upper members 20, 22 in this example are each plate-like and rectangular, are in spaced parallel relationship to one another, are horizontally disposed, and are rigidly connected to one another via vertically oriented rigid connecting posts 24. Upper member 22 and lower member 20 are preferably of rigid materials such as rigid plastics, as are connecting posts 24 which may be integrally molded as on part with upper member 22. Typically four connecting posts 24 would be used as indicated in dotted outline in FIG. 1. Upper member 22 includes an opening 26 in which trackball 12 resides and extends partly therethrough, and opening 26 may include an annular raised lip or ring such as a threaded ring 28 or the like for engaging a cooperatively structured collet 16 such as one having threading at the bottom edge thereof, or it may be an opening absent any raised lip or extending collet as illustrated in FIG. 8 wherein trackball 12 is shown extending upward through opening 26 in upper member 22. Collet 16, if utilized, serves as an easily gripped member allowing the human hand to move carriage 14 and thus trackball 12 in any linear direction desired, although when a collet 16 is not utilized, trackball 12 can be grasped by the fingers of the hand to also move carriage 14 in any linear direction. I prefer the use of a collet 16 because it renders linear movements of carriage 14 easier, and a collet 16 as shown in FIGS. 2–3, i.e., outward and upwardly extending with an open space thereunder allows the user to place collet 16 between his index and middle fingers with his hand partially inverted to move carriage 14 in any linear direction while having his thumb on the exposed portion of trackball 12 to rotate the trackball about any axis, and this all with just one hand. This placement of the hand and thumb is of course up to individual choice, although such hand and finger placement as described above will function well. A collet 16 as shown in FIG. 9 will also function well, although it does not provide a lip for the user's fingers to hook under or straddle as described above. If a collet is not used, then the exposed portion of trackball 12 is available for grasping with the fingers to apply force in any linear direction, much like a basketball player grasps a basketball in one hand or in the fingers. I have considered placing an exposed handle extending from the upper member 22 adjacent trackball 12 to be grasped to apply linear forces to carriage 14 and thus trackball 12, but I prefer a collet 16 around trackball 12 because it is a central manipulating area rendering the controller more intuitive via centralizing the area for hand input for both linear and rotational force, and collet 16 retains trackball 12 in an easily installable, removable fashion for cleaning and initial ease of manufacturing and assembly, and this is believed to be clearly advantageous.

I have also designed an embodiment with collet 14 having an extending shaft portion to support trackball 12 in a substantially elevated position above the upper surface of housing 10, wherein carriage 14 possibly in conjunction with a collet 16 define an elevated handle-like pod retaining the in-part exposed spherically rotatable trackball 12 on the distal end of an extending handle-like structure. The sensors (encoders) for detecting rotation of trackball 12 about the yaw, pitch and roll axes would need to be appropriately positioned and mounted to be in contact with trackball 12.

Lower member 20 of carriage 14 preferably physically supports rollers, bearing or slide members or smooth surfaces which otherwise aid in supporting trackball 12 in a freely spherically rotatable manner, and in the example illustrated, three mutually perpendicular encoders (sensors) 124, 126, 128 for sensing rotation, direction and amount of rotation of trackball 12 about the yaw, pitch and roll axes include rotatable wheels upon and against which trackball 12 rests, and is thereby rotatably supported. In most applications, the weight of trackball 12 and its most common positioning within the supporting rotatable wheels of the encoders causes sufficient frictional engagement between the encoder wheels and trackball 12 so that rotation of the trackball causes rotation of one or more of the encoders, depending upon the axis about which trackball 12 is rotated. The structure of carriage 14 and collet 16 if the extending collet is used, is sufficiently close in fit to trackball 12 to render a substantial link in linear movement between carriage 14, collet 16 and trackball 12. In other words, linear movements in trackball 12 are substantially equal to linear movement of carriage 14 and collet 16. It should be noted that I consider collet 16 as shown in FIG. 2 and some other drawings, whether it is a fixed or rotatable collet (to be detailed) to be part of carriage 14 since it is supported or fastened to carriage 14 and moves therewith.

Figure 7:
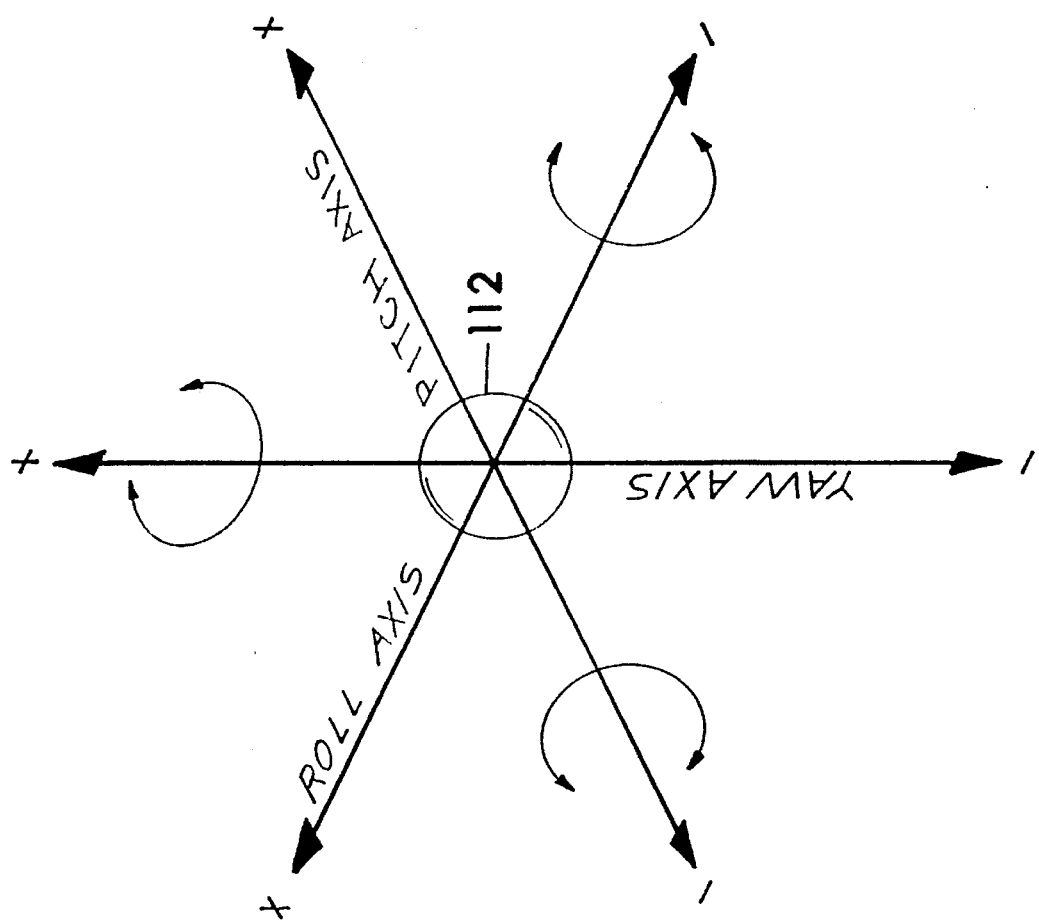
FIG. 7 shows three mutually perpendicular axes herein referred to as yaw, pitch and roll shown having a mutual point of intersection at the center of the trackball.

As previously stated, carriage 14 is supported with structuring for allowing it to be movable in all linear directions relative to housing 10, for example, left and right which is linear movement along the pitch axis in this example; forward and rearward which is linear movement along the roll axis in this example; up and down which is linear movement along the yaw axis in this example; and in the possible combinations thereof, and sensors are positioned to detect and provide (output) information related to such linear movements of carriage 14 relative to housing 10. Clearly since trackball 12 and collet 16 are linked to move linearly with carriage 14, trackball 12 can be moved linearly in all directions relative to housing 10. I prefer carriage 14 to not be rotatable relative to housing 10 since rotation interpretations about the three mutually perpendicular axes (see FIG. 7) are provided via trackball 12 and encoders 124, 126, 128 for sensing spherical rotation of trackball 12 about yaw, pitch and roll. Therefore, I prefer carriage 14 to be supported or retained in such a manner and by appropriate structure to allow carriage 14 to be moved linearly in all possible directions, but prevented from being axially rotated relative to housing 10 so that trackball 12 can be rotated when desired without carriage 14 unintentionally being rotated, and this so the encoders will be rotated. I would consider it to be within the scope of the invention if carriage 14 was to be supported in a manner which would allow limited axial rotation thereof, although I believe this to be an undesirable aspect.

Figure 6:
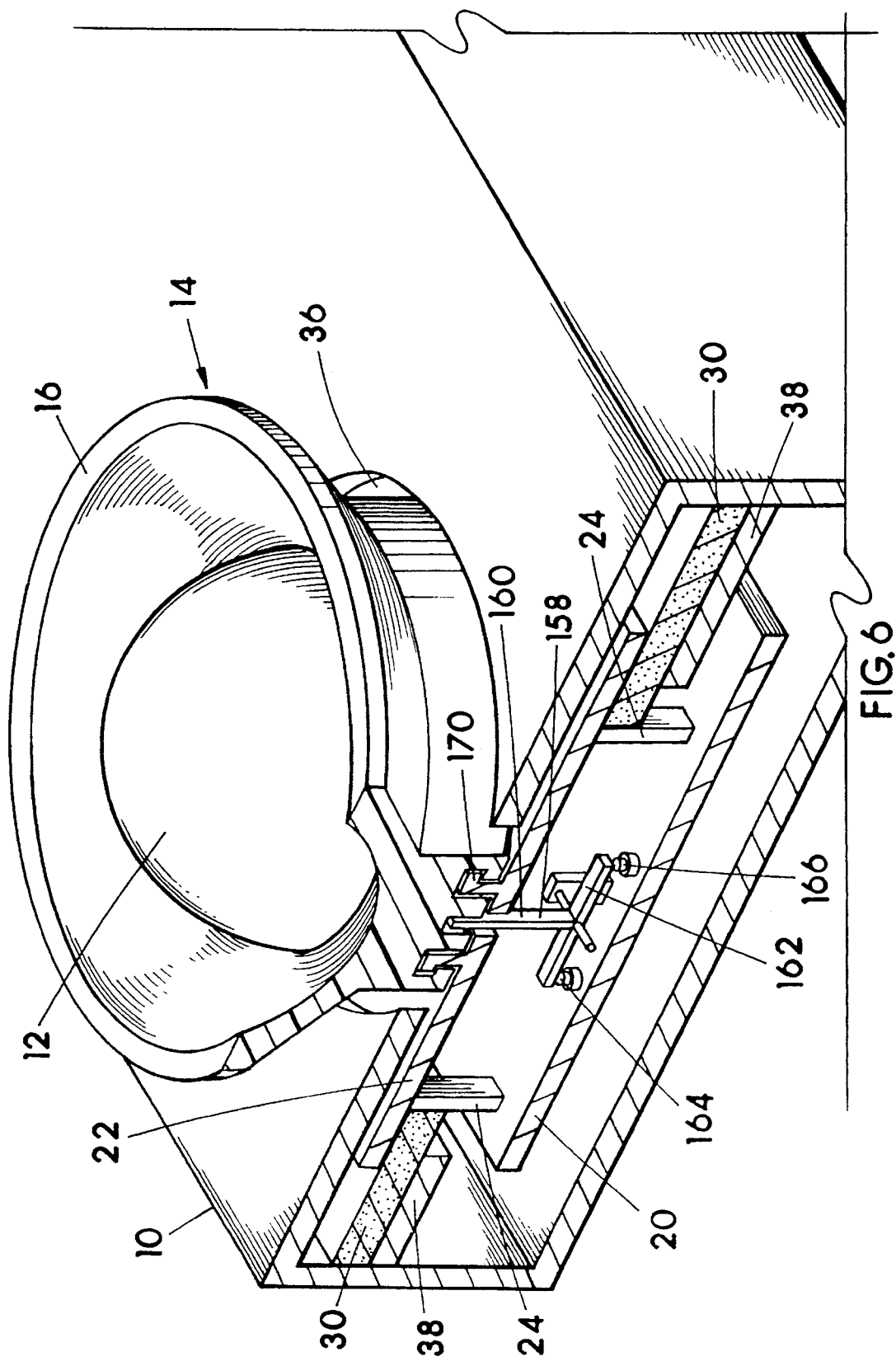
FIG. 6 is an illustration showing a portion of a housing, a carriage, a trackball, and another form of the rotatable collet.

Although the structuring to physically support carriage 14 so it can be moved in any linear direction can conceivably be accomplished through numerous structural arrangements, essentially two are illustrated for example in the included drawings, with a first shown in FIGS. 1–4, and a second shown in FIG. 6. As mentioned above, I prefer there be a return-to-center aspect regarding carriage 14, and preferably a center null associated with this return-to-center wherein no significant linear sensor activation occurs. This carriage return-to-center and to center null can conceivably be accomplished with numerous structures, but one structure which should be readily understandable and therefore makes a good example is to simply utilize on/off switches as the carriage position linear sensors for moment related information output, with the switches including activation buttons which are outwardly spring biased, wherein carriage 14 can be pushed against one of the switches to the point of activating the switch (closing a set of contacts), which of course sends or outputs information relating to this event via allowing or interrupting current flow, and the button spring being depressed by carriage 14 would then push carriage 14 back toward the center and the null position upon the user releasing pressure toward that particular switch. Furthermore, as mentioned above, if such an on/off switch using spring biasing were to be of a type which made a detectable click or snap upon being activated by pressure from carriage 14, and this is a commonly available snap switch, then this click or snap could be felt or heard by the user, and thus the user would be provided information alerting him of the activation or possibly deactivation of the switch. Snapping or clicking mechanisms which are not sensors can of course be installed when sensors of a type which are silent are used, and tactile or audible signals indicating sensor activation or deactivation is desired.

With reference to FIGS. 2–3, expanded foam rubber 30 is shown placed against the bottom interior of housing 10 and underneath lower member 20 of carriage 14. Snap or spring biased switches as described above may be used in conjunction with foam rubber 30. Foam rubber 30 is a resiliently compressible and thus spring material. Foam rubber 30, and other spring materials such as coiled compression springs, leaf springs and the like could conceivably be used instead of foam rubber, however foam rubber functions well, is inexpensive, readily available and easily shaped or cut. I have even considered suspending carriage 14 on tension springs hung from the underside interior of housing 10, but this seems to be an excessively complicated structure compared to using foam rubber as shown and described. Foam rubber 30 in the example of FIGS. 2–3 is a rectangular piece having a center cut-out or opening at 32 to allow for the interaction of down sensor 110 shown mounted on the underside of lower member 20 with actuator 108 specific for interaction with down sensor 110 located beneath the sensor 110. The actuator 108 for down sensor 110 is sized to allow the abutment or actuation of the down sensor 110 no matter where carriage 14 has been moved laterally when the user wishes to push down on carriage 14 to activate the sensor 110. Foam rubber 30 being compressible will allow the user to push down on trackball 12 or collet 16, or possibly the exposed top of carriage 14 (upper member 22) to push carriage 14 downward to activate the down sensor 110. This pushing downward compresses the foam rubber 30, and when the user releases the downward pressure, the foam rubber 30 being resilient pushes carriage 14 upward again to deactivate the down sensor 110 and to move carriage 14 into the center null position. Foam rubber 30 in the example shown in FIGS. 2–3 is rectangular and slightly larger in all dimensions than the size of lower member 20, and the foam rubber 30 is affixed to the underside of lower member 20 such as by glue or mechanical fasteners so that the foam is securely affixed to the lower member (carriage). Since the foam rubber 30 is slightly larger than the lower member 20, the foam rubber 30 extends outward laterally beyond all peripheral sides of the lower member 20. This extending portion of the foam rubber 30 serves as a spring bumper which as shown in FIG. 2 is compressed against actuators 100, 104 (or housing side walls 18 under some circumstances) prior to the sensors 102, 106 shown on the left and right being activated, and in the case of the FIG. 3 drawing is compressed against the side walls 18 of housing 10 prior to the sensors 118, 122 shown on the left and right being activated. When the user releases the pushing pressure, the compressed foam rubber 30 will push carriage 14 back toward the center null position, as the foam rubber 30 is normally in a partially extended state, being able to be compressed and to then spring back. The up sensor 114 shown in FIG. 2 is shown mounted on the top of the lower member 20, and the weight of carriage 14 is normally sufficient to pull carriage 14 and sensor 114 downward away from its actuator 112 upon release of upward pulling pressure by the user, although a spring such as a foam rubber pad or the like could conceivably be placed between the underside of the housing top panel and the upper member 22 to push carriage 14 downward to deactivate the up sensor 114 if weight and gravity were insufficient or unavailable such as in outer space. The actuator 112 for the up sensor 114 is shown suspended from the interior underside of the housing top portion, and is a member which may be formed as an integral component of housing 10 if desired. The actuator 112 for the up sensor 114 may be simply an anvil against which a snap switch mounted on carriage 14 strikes or is pressed against, or it may be a second component of the sensor, or may be supporting a second component of the sensor such as the second component of a two piece proximity sensor, and this is generally true of all of the actuators shown and described. Also generally true of all of the actuators shown and described is that they must be sufficiently large and or properly positioned be useful even when carriage 14 is moved to any allowed extreme position.

Figure 4:
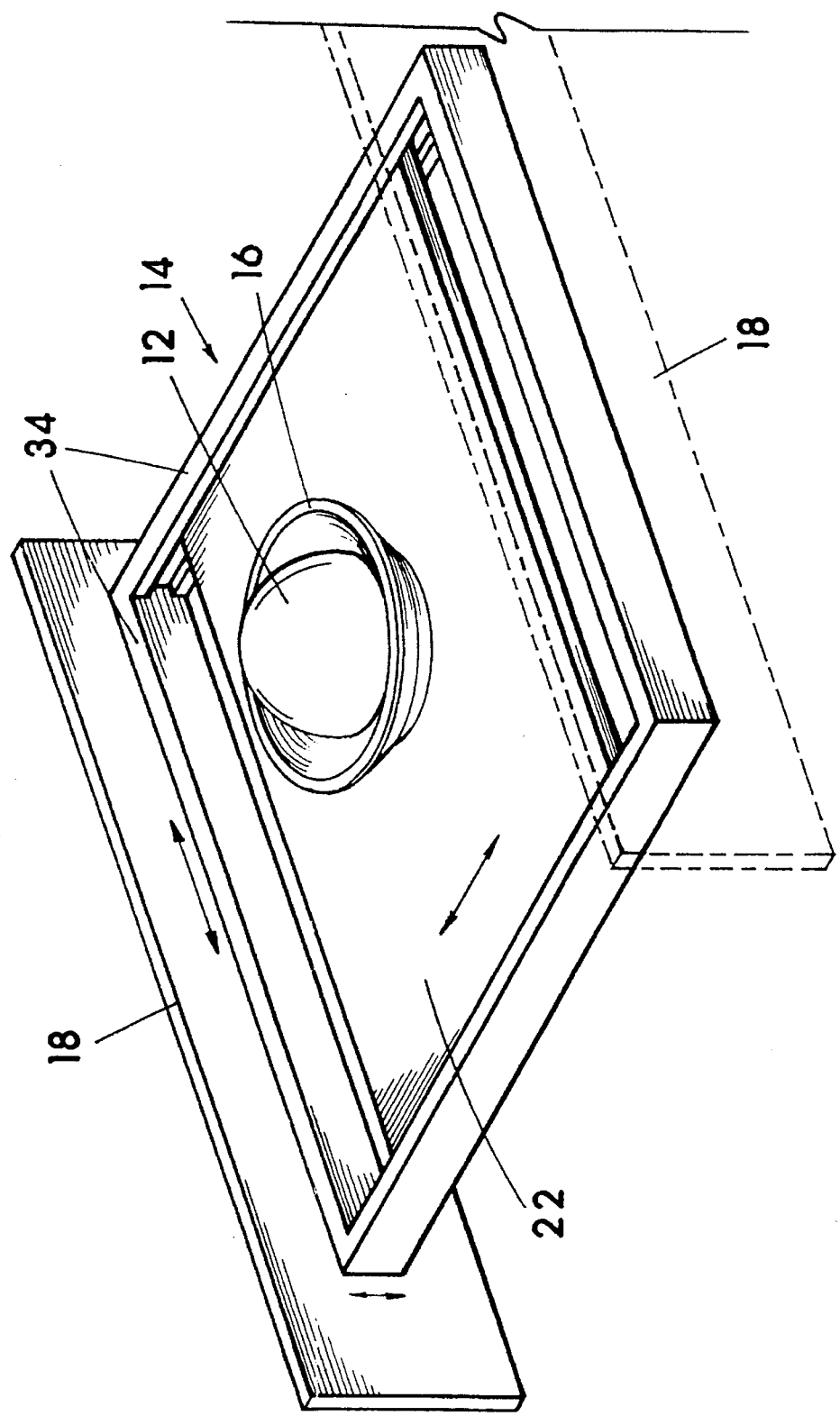
FIG. 4 is a partial illustration of a carriage, a trackball and a track frame between two walls.

In FIGS. 2–4 is track frame 34 located under the top of housing 10. Track frame 34 is free to be moved vertically within housing 10, which will allow carriage 14 to be moved vertically to activate the up or down sensors 114, 110. Additionally from FIGS. 2–3 it can be seen that carriage 14 is sized and shaped relative to housing 10 and components within housing 10 such as the actuators to allow carriage 14 to be moved in all linear directions, although only in small amounts in the example shown. I prefer the linear movement requirements from the center null to activating a sensor or sensors to be small, although the distances could be made substantial if desired. The track frame 34 is a structure which can be utilized to positively prevent axial rotation of carriage 14. The foam rubber 30 of FIGS. 2–3 being positioned tightly between either walls or actuators or both on the four peripheral sides of the foam normally serves to a satisfactory degree as an anti-axial rotation structure for carriage 14, however, for more positive prevention of axial rotation of carriage 14, track frame 34 or like structure may be applied. As shown in FIG. 4, track frame 34 is a rectangular frame opened centrally in which upper member 22 is slidably retained. Two oppositely disposed sides of frame 34 are abutted, but slidably so, against and between two stationary parallel walls which may be side walls 18 of housing 10 or partitions installed specific for this purpose. The lower member 20 in this arrangement would be supported by resting on foam rubber 30, and if upper member 22 were pushed forward or rearward for example, frame 34 would slide between the walls 18. Frame 34 can also move up and down sliding between the walls 18, but due to the close fit, the frame 34 will not axially rotate between the walls 18. The upper member 22 fits lengthwise snugly yet slidably between two oppositely disposed U-shaped track sides of frame 34 as can be seen in FIGS. 2 and 4, but is narrower than the width of the frame 34 as can be seen in FIGS. 3–4, and thus when upper member 22 is pushed forward and rearward (for example) it pushes frame 34 with it due to the close fit in this direction between the frame 34 and upper member 22, and when upper member 22 is pushed left and right (for example) it slides in the U-shaped track portion of frame 34, as the frame 34 cannot move in these directions due to its close abutment against the parallel walls 18. When upper member 22 is moved up and down, track frame 34 moves up and down also, as does the balance of carriage 14 and trackball 12. It should be remembered that in this example, upper member 22 and lower member 20 are rigidly tied together with connecting posts 24, and that the members 20 and 22 constitute components of carriage 14, and that the carriage is to be manually manipulated linearly via a hand applying force to collet 16 or the trackball or both, or possibly an exposed portion of the upper member 22 as mentioned previously. It should be noted that a space 36 or clearance is provided between the upper portion of the housing surrounding trackball 12, carriage 14 or collet 16 to allow movement of carriage 14 laterally, since carriage 14 and trackball 12 move independent of housing 10. The space 36 or crack may be covered with flexible or rubbery sheet material or any suitable boot or seal arrangement to exclude debris, or the space 36 (crack) may be kept (manufactured) narrow or small to be less likely to collect debris.

Another example of using foam rubber 30 is shown in FIG. 6 wherein the foam 30 is located atop a stationary shelf 38 within housing 10, and directly under upper member 22 which rests atop of the foam rubber 30. Foam rubber 30 extends beyond shelf 38 inward as may be seen in the drawing. The inward most edges of the foam rubber 30 are abutted against the vertical connecting posts 24 of carriage 14. The carriage 14 being supported by foam rubber 30 being between the underside of upper member 22 and the top of the shelf 38 is allowed to be moved in all linear directions, and the foam rubber 30 abutting connecting posts 24 and abutting the interior of the housing walls as shown functions as a return-to-center and return to null arrangement much like that described for the FIGS. 2–3 structural arrangement. The shelf 38 in this example should be on all interior sidewalls of housing 10, or at least under some resilient foam placed about the periphery of carriage 14. It should be noted clearance above upper member 22 and the top interior surface of housing 10 must be provided to allow upward movement of carriage 14 with pulling action to activate the up sensor 114, and the support for carriage 14 such as the foam rubber must allow carriage 14 to move away and to clear the activation of the up sensor 114 upon the termination of the upward pulling pressure on carriage 14, and this principle applies in most if not all embodiments of the invention.

Figure 5:
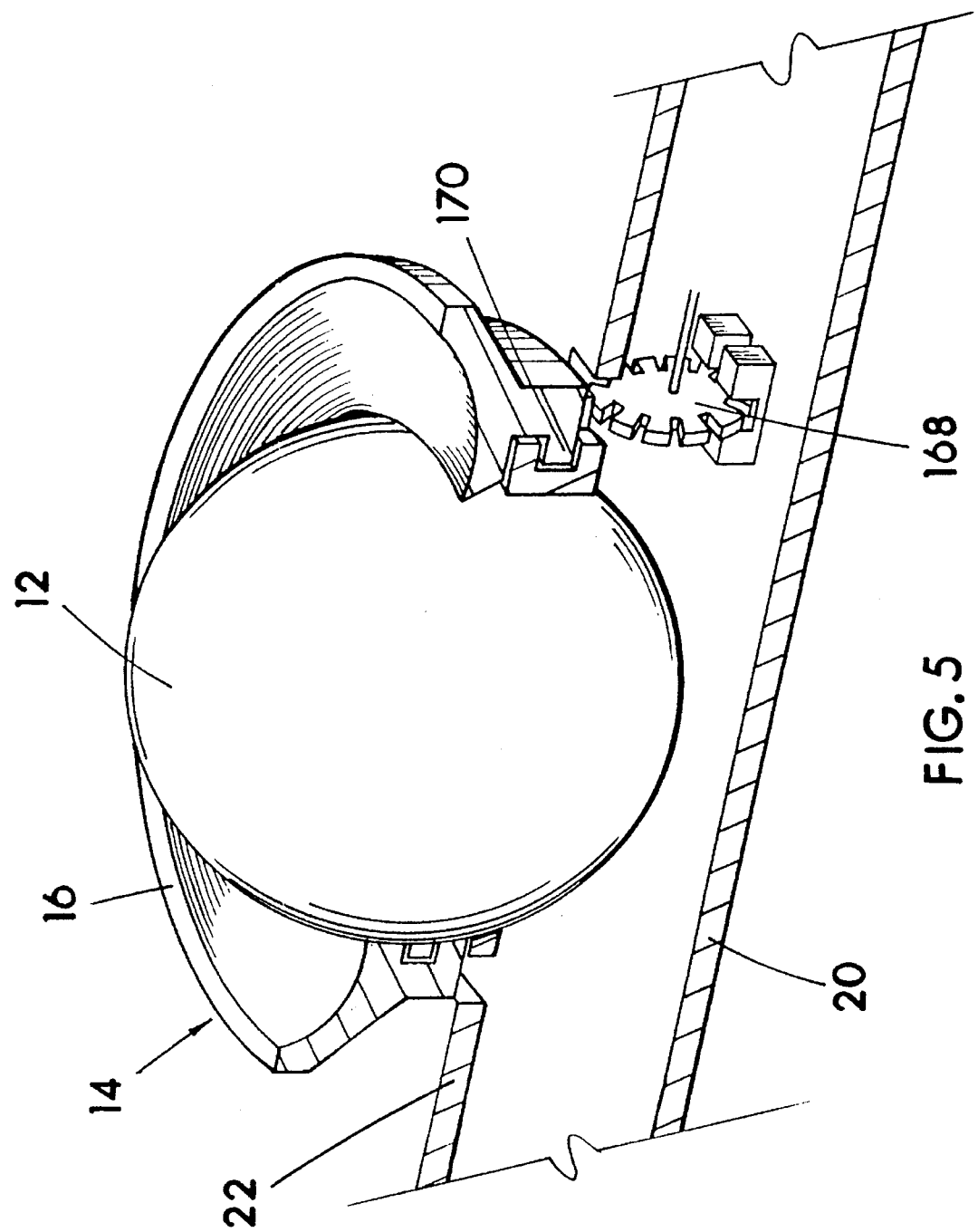
FIG. 5 is an illustration showing a portion of a carriage, a trackball, and a collet which is rotatable about the trackball which can be used within the scope of the present invention. An encoder is shown as an example of a sensor in contact with the bottom of the collet.

With reference to FIGS. 5–6 for a brief description of an optional arrangement wherein collet 16 could be rotatably attached to upper member 22 allowing collet 16 to be manually rotated about trackball 12, as opposed to being non-rotatably affixed to upper member 22 as in the FIGS. 1–3 embodiment. The rotatable collet of FIGS. 5–6 may at least for some users be an easier process to achieve rotation about the yaw axis as compared to rotating trackball 12 at least in terms of rotation about yaw. The rotating collet may be able to rotate 360 degrees as in FIG. 5, or only in part rotatable as in FIG. 6 wherein collet 16 can only move through a short arc back and forth, being limited such as by a multi-position rocker style sensor 158. Both of the collets 16 shown in FIGS. 5–6 are connected to the upper member 22 via a loose fit tongue and groove connection shown for example at 170, the tongue being an upward extension of upper member 22 and the groove being a component of collet 16 and engaged over the tongue. In FIG. 5 an optical encoder 168 is shown as an example of a sensor in contact with the bottom of collet 16 so that rotation of collet 16 in either direction rotates the optical wheel of the encoder 168, this could be achieved by gear teeth around the outer periphery of a drive wheel of encoder 168 mated to gear teeth around the bottom of collet 16, and the encoder outputs information indicative of the direction and amount of rotation of collet 16 about the yaw axis. In FIG. 6 a rocker style sensor assembly 158 includes a T-shaped member and having a vertical center arm 160 engaged within a groove in the underside of collet 16, and the T-shaped member being pivotally supported at a lower center so that the two oppositely disposed lateral arms 162 may be pivotally moved up and down dependant upon the direction of rotation of the collet to interact with a direction indicating negative sensor 164 and a direction indicating positive sensor 166 shown mounted on lower member 20. The negative and positive sensors 164, 166 may be simple on/off switches, or may be more sophisticated sensors which indicate degree or pressure in addition to the direction collet 16 has been rotated, such as by varying voltage via resistance changes, or by varying electrical output such as with piezo electric material and the like. When a rotatable collet is used, a sensor is used to detect rotation of collet 16 as described above, but this does not bar still having a sensor (encoder) in communication with trackball 12 for detecting rotation of the trackball about the yaw axis, and this would give the user the option of rotating about yaw via the trackball or the rotatable collet.

I prefer, in all embodiments of the present invention, although it is not essential to be within the scope of the invention, that most all of the circuits, switches and sensors be mounted on carriage 14, and more particularly the lower member 20, and this being an advantage for maintaining low cost in manufacturing. Dependant upon the type and sophistication of the sensors utilized in the present controller, and the electronics and/or software and electronics of the host graphics image generation device which the present invention is intended to interface, and at least in part control, there may be little more than flexible electrical conductors connected to on/off switches mounted on the lower member 20, with the flexible conductors leaving the lower member to exit housing 10 via a cord 156 connectable to the host image generation device, or leaving circuitry on lower member 20 to connect to an emitter of electromagnetic radiation (not shown) mounted on housing 10 for communicating the linear moment and rotational information with the host device via wireless communication such as via infra red light or radio signals. Lower member 20 may be a printed circuit board having sensors, integrated and or discrete electronic components thereon, and in FIG. 2 an application specific integrated circuit chip is illustrated at 130 which could be utilized for computations, encoding, memory, signal translations such as analog to digital conversions, data formatting for communication to the host device, serial and/or parallel communications interfacing, and the like steps or processes. The specific circuitry and electronics built onto or into the present invention will in all likelihood be different when the invention is built primarily for use with a personal desk top computer than when it is built primarily for use with an interactive television or television based electronic game for example. Any required electrical power for electronics or sensors or output signals may be provided by batteries within housing 10, or via a connected cord or any other suitable power source. A combination of electrical power inputs may be used, and this would depend on the particular application for which the controller was designed.

As previously mentioned, housing 10 may be in numerous forms, for example, FIG. 8 is an illustration of housing 10 structured specifically for carriage 14 and trackball 12, and one which is structured to rest upon a support surface such as a table or desk when utilized, and this unit may be used to replace a typical mouse used with a computer. An optional extending portion 142 is shown indicated in dotted outline, and which is ergonomically designed as a wrist and forearm rest. The embodiment shown in FIG. 8 is also shown with two thumb select switches 144 and two finger select switches 146 which may be included to be used as function select switches as is common on a trackball, mouse or joy stick. A further example of a useful housing 10 is shown in FIG. 9 wherein a hand held housing 10 sized and shaped to be grasped in a hand of a user while the user manipulates graphic images with the controller in accordance with the present invention is shown. This "remote control" style version of the invention may be direct wired with long flexible conductors to the host graphic image generation device (computer or television for example), but is preferably a wireless remote controller which sends information to the graphics generation device via wireless electromagnetic radiation indicated at 138. The FIG. 9 remote control is battery powered with a battery in compartment 134, and may include a scan or program window shown at 132 for allowing programing of internal electronics. This version may prove to be particularly useful with interactive television and interactive three-dimensional displays such as are commonly referred to as virtual reality displays, and most likely will include additional function keys 136 for on/off, volume, channel selection, special functions and the like.

Figure 11:
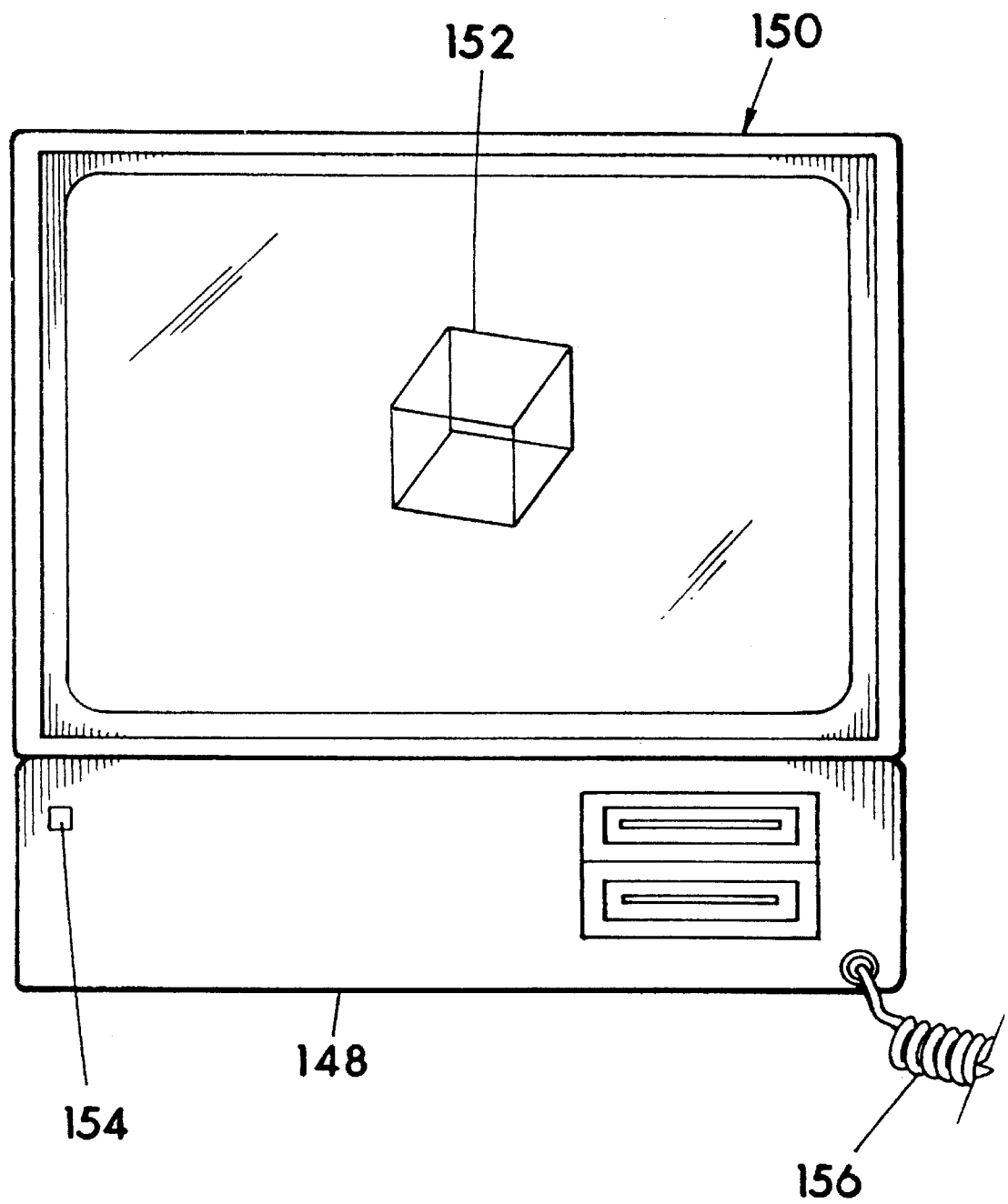
FIG. 11 represents a display such as a computer or television display showing a cube displayed three dimensionally.

FIG. 10 shows carriage 14 and trackball 12 housed in an otherwise relatively conventional computer keyboard 140. FIG. 11 represents a desk top computer 148 as an example of a graphic image generation device, and shown on the display 150 (computer monitor) is a cube 152 displayed three dimensionally. An electromagnetic signal receiver window is shown at 154 for receiving signals such as are sent via a wireless communicating version of the present invention such as that shown in FIG. 9. Alternatively the keyboard 140 of FIG. 10 could be connected to the host image generation device via flexible conductor set 156 to allow typical keyboarding when desired, and control of graphic images with the use of the present six degree of freedom controller when desired.

Although I have very specifically described best modes and preferred structures and use of the invention, it should be understood that many changes in the specific structures and modes described and shown in my drawings may clearly be made without departing from the true scope of the invention.

What I claim as my invention is:

1. A hand manipulated multi-axis graphic image controller for outputting control information to a graphics generation device for control of graphic images, said controller comprising;

a housing, a carriage at least in part within said housing, means for allowing linear movement of said carriage along multiple perpendicular axes relative to said housing, means for sensing linear moment of said carriage relative to said housing and creation of linear moment related information, a trackball retained by said carriage so that linear movements of said trackball and said carriage are maintained substantially equal, said trackball being spherically rotatable independent of said carriage, said trackball at least in part exposed to allow manual manipulation thereof, means for sensing rotation of said trackball relative to said carriage and for creation of rotational related information indicative of direction and amount of rotation of said trackball, means for outputting said linear moment related information and said rotational related information to a graphics generation device.

2. A hand manipulated multi-axis graphic image controller according to claim 1 wherein said housing is a housing structured to rest upon a support surface when utilized during hand manipulation of the controller.

3. A hand manipulated multi-axis graphic image controller according to claim 1 wherein said housing is a computer keyboard housing.

4. A hand manipulated multi-axis graphic image controller according to claim 1 wherein said housing is a hand held housing sized and shaped to be grasped and held in a hand of a user while the user manipulates graphic images with the controller.

5. A hand manipulated multi-axis graphic image controller according to claim 4 wherein said outputting of the information to the graphics generation device is via wireless electromagnetic radiation.

6. A hand manipulated multi-axis graphic image controller according to claim 1 wherein said carriage includes plate structure within said housing; the plate structure supporting a collet about said trackball.

7. A hand manipulated multi-axis graphic image controller according to claim 6 wherein said collet is in-part exposed beyond said housing with the exposed portion of said collet providing surface against which manual force can be applied to move said carriage and thus said trackball linearly relative to said housing along the multiple perpendicular axes.

8. A hand manipulated multi-axis graphic image controller according to claim 1 wherein said means for allowing linear movement of said carriage includes resiliently compressible spring material upon which said carriage is supported.

9. A hand manipulated graphic image controller having six degrees of freedom, wherein information describing spherical rotation of a trackball of the controller about three mutually perpendicular axes of yaw, pitch and roll, and information describing linear moment of said trackball along said axes is output to a graphics generation device from said controller for control of graphic images, said controller comprising;

a housing, a carriage at least in part within said housing and movably supported by support means within said housing for allowing linear movement of said carriage relative to said housing along any of said three mutually perpendicular axes of yaw, pitch and roll, said trackball retained by said carriage so that linear movements of said trackball and said carriage are maintained substantially equal; said trackball being spherically rotatable about the three axes independent of said carriage, said trackball at least in part exposed to allow manual manipulation thereof, means for sensing rotation of said trackball relative to said carriage and for creation of rotational related information indicative of direction and amount of rotation of said trackball, means for sensing linear moment of said carriage and thus said trackball relative to said housing and creating linear moment related information, means for outputting said linear moment related information and said rotational related information to a graphics generation device.

10. A hand manipulated graphic image controller having six degrees of freedom according to claim 9 wherein said housing is structured to rest upon a support surface when utilized during hand manipulation of the controller.

11. A hand manipulated graphic image controller having six degrees of freedom according to claim 9 wherein said housing is a computer keyboard housing.

12. A hand manipulated graphic image controller having six degrees of freedom according to claim 9 wherein said housing is a hand held housing sized and shaped to be grasped in a hand of a user while the user manipulates graphic images with the controller.

13. A hand manipulated graphic image controller having six degrees of freedom according to claim 12 wherein the outputing of the information to a graphics generation device is via wireless electromagnetic radiation.

14. A hand manipulated graphic image controller having six degrees of freedom according to claim 9 wherein said support means within said housing for allowing linear movement of said carriage along any of said three mutually perpendicular axes of yaw, pitch and roll, includes resiliently compressible spring material upon which said carriage is supported with said spring material in at least a partially extended state for allowing downward travel of said carriage followed by said spring material raising said carriage upward.

15. A hand manipulated multi-axis graphic image controller for outputting control information to a graphics generation device for control of graphic images, said controller comprising;

a housing, a carriage at least in part within said housing and movably supported by support means within said housing for allowing linear movement of said carriage relative to said housing along multiple perpendicular axes, means for sensing linear moment of said carriage relative to said housing and creation of linear moment related information, a collet supported as part of said carriage so that linear movements of said collet and said carriage are maintained substantially equal, said collet being rotatable relative to said carriage about one of the multiple perpendicular axes, means for sensing rotation of said collet relative to said carriage and for creation of rotational related information indicative of direction of rotation of said collet, a trackball retained by said carriage and said collet so that linear movements of said trackball and said carriage and said collet are maintained substantially equal, said trackball being spherically rotatable independent of said carriage and said collet, said trackball at least in part exposed to allow manual manipulation thereof, means for sensing rotation of said trackball relative to said carriage and said collet and for creation of rotational related information indicative of direction and amount of rotation of said trackball, means for outputting said linear moment related information and said rotational related information to a graphics generation device.

16. A method of manipulating graphic images of a graphics generation device utilizing a hand manipulated multi-axes graphic image controller, wherein information describing spherical rotation of a trackball of the controller about multiple perpendicular axes, and information describing linear moment of said trackball and a trackball retaining carriage along said multiple perpendicular axes is output to the graphics generation device from said controller for control of graphic images, said controller being of a type comprising a housing with the carriage at least in part within said housing and movably supported by support means within said housing for allowing linear movement of said carriage along said multiple perpendicular axes; sensor means for sensing linear moment of said carriage relative to said housing and creating linear moment related information; said trackball retained by said carriage so that linear movements along said multiple perpendicular axes of said trackball and said carriage are maintained substantially equal; said trackball being spherically rotatable about the axes independent of said carriage, said trackball at least in part exposed to allow manual manipulation thereof; means for sensing rotation of said trackball relative to said carriage and for creation of rotational related information indicative of direction and amount of rotation of said trackball; means for outputting said linear moment related information and said rotational related information to a graphics generation device;

said method comprising the steps of:
(a) manually rotating said trackball for rotationally manipulating the graphic images; and,
(b) manually applying linear force to said carriage for moving said carriage along said multiple perpendicular axes independent of said housing for linearly manipulating the graphic images.

17. A method of manipulating graphic images of a graphics generation device utilizing a hand manipulated graphic image controller having at least five degrees of freedom, wherein information describing linear moment of a trackball of the controller along three mutually perpendicular axes, and information describing spherical rotation of said trackball about at least two axes of said three mutually perpendicular axes is output to a graphics generation device;

said method comprising the steps of:
(a) moving said trackball along said three mutually perpendicular axes for linearly manipulating at least one of said graphic images; and,
(b) rotating said trackball for rotationally manipulating at least one of said graphic images.

18. A method of manipulating graphic images according to claim 17 further including the step of
(c) rotating a collet about one of the axes for rotationally manipulating at least one of said graphic images.

\* \* \* \* \*